United States Patent Office 3,550,074
Patented Dec. 22, 1970

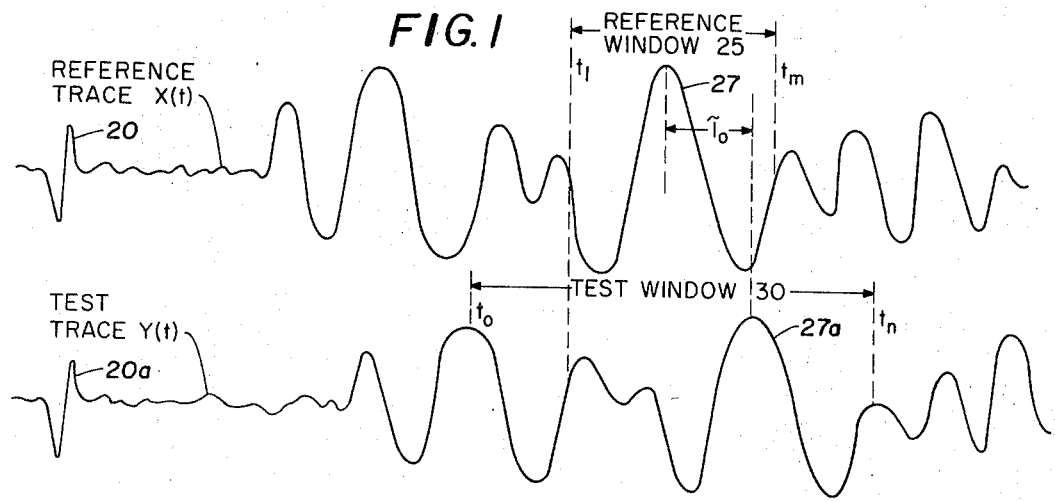
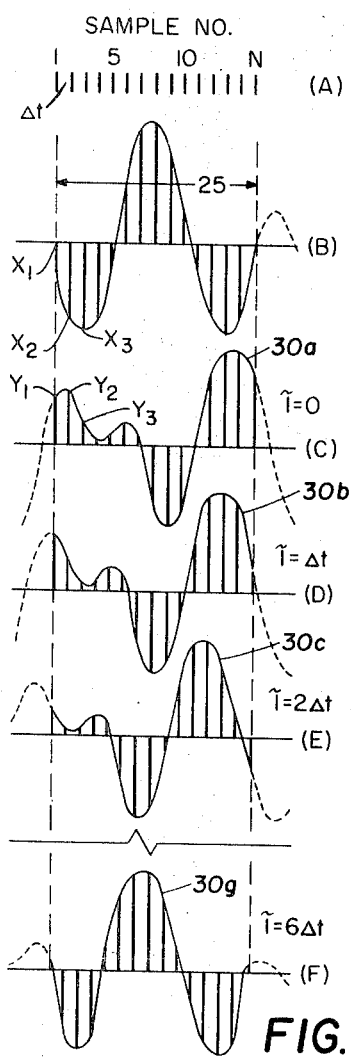
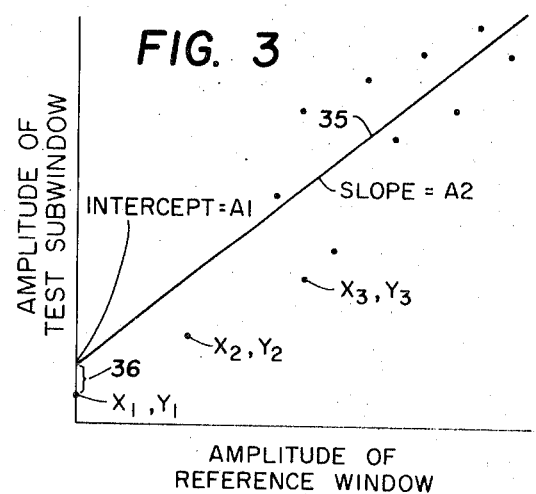
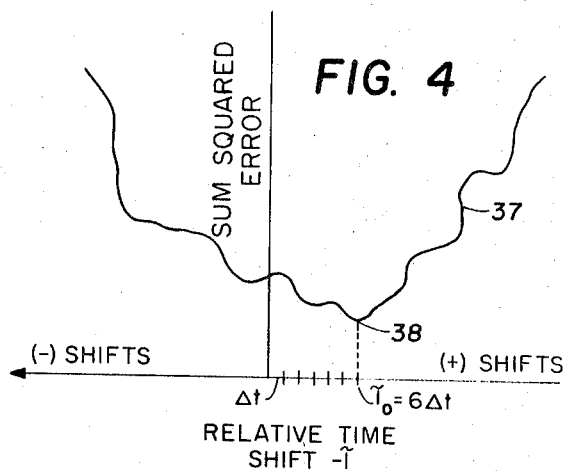

3,550,074
METHOD OF DETERMINING THE STATIC SHIFT BETWEEN GEOPHYSICAL SIGNALS
Clyde W. Kerns, Irving, and Eugene K. Lee, Dallas, Tex., assignors to Mobil Oil Corporation, a corporation of New York
Filed Dec. 28, 1966, Ser. No. 605,290
Int. Cl. G01v 1/28
U.S. Cl. 340—15.5                                    7 Claims

ABSTRACT OF THE DISCLOSURE

The specification discloses an automated method, which may be carried out on a general purpose digital computer, for determining and correcting for the relative static time shift between geophysical signals such as seismic traces. The method involves shifting a reference segment or window from a reference trace relative to a test trace and determining which window of the same length from the test trace best fits the reference window. The criterion for best fit is that, under a transformation to Cartesian coordinates, the best fit of the two trace windows becomes a best fit to a straight line in the Least Squares sense.

BACKGROUND OF THE INVENTION

This invention relates generally to geophysical data processing and more particularly to an automated method for determining the relative static time shift between geophysical signals.

In seismic traces, well logs, and other types of geophysical data there often exists a relative static shift among the data. It is often desirable to know this relative static shift so that the data can be properly corrected or at least taken into account in the interpretation of the geological characteristics of the earth. Since this invention is particularly suitable to the determination of the static time error between seismic traces, it will be described with reference to such determination.

In reflection seismic exploration, a seismic source, such as dynamite, applies acoustic energy to the earth at a shot point for travel of acoustic wave energy downward toward subsurface layerings or horizons. At each subsurface horizon a portion of the energy is reflected upward for reception at spaced detectors or geophones located on the earth and spaced from the shot point. Electrical signals representative of the acoustic waves received at the detectors are recorded in the field, usually on magnetic tape and in the familiar record section format of a plurality of side-by-side wiggle traces.

Before the reflections on the wiggle trace record section can be interpreted accurately and used as a map of the cross section of the subsurface layering of the earth, two forms of time corrections must be made. The first of these time corrections, the so-called dynamic or normal moveout correction, is performed to compensate for a time error which varies dynamically along the length of a trace. Normal moveout correction is performed to compensate each of the seismic traces for the differences in horizontal distance between shot point and detector.

The other of these time corrections, the so-called static correction, is performed to compensate for a time error which is constant along the length of a trace. One constant time error arises because of the difference in elevation of the detectors associated with each seismic trace. The reflections along the length of one wiggle trace are shifted by a constant time increment compared to corresponding reflections along the length of another wiggle trace recorded at a detector of difference elevation. Another constant time error is introduced by the unconsolidated layering near the surface of the earth called the weathered layer. To compensate the seismic traces, both for the elevational error and the weathering error, the wiggle traces must be shifted or referred to a common datum plane below the weathered layer. The seismic traces are each shifted by a constant time increment to make the trace appear as if it had been recorded at a detector located on the datum plane in response to acoustic energy generated at a shot point also located on the datum plane.

In the past, the static time error between seismic traces was "picked" by a seismologist viewing a wiggle trace record section supplemented with survey data on the elevation of the field detectors. Static picking by a seismologist was a long and tedious procedure. With the great masses of modern-day geophysical exploration data to be interpreted, there has been a long standing need for an automated method of picking the static corrections so that the traces may be corrected by proper time shifting.

SUMMARY OF THE INVENTION

The present invention provides a machine-implemented method of determining the static shift between a first geophysical signal and a second geophysical signal having the same independent variable. First, there is generated a criterion function representative of the analytic expression for the approximate straight-line fit to the actual function of the amplitude of the first geophysical signal versus the amplitude of the second geophysical signal for values of the independent variable of one of the signals. Second, there is generated an error function representative of the error between the criterion function and the actual function. Third, the geophysical signals are shifted relative to one another with respect to the independent variable, and the foregoing steps are repeated for each relative shift. Finally, there is selected as the static time shift between the geophysical signals a shift related to the relative shift which corresponds with the minimum of the error function.

BRIEF DESCRIPTION OF THE DRAWINGS

In the drawings where like reference characters indicate like elements,

FIG. 1 is a plot of a reference seismic trace and a test seismic trace;

FIGS. 2A–2F are a sequence of graphs illustrating the successive process of shifting in a positive direction a test window selected from the test trace relative to a reference window selected from the reference trace;

FIG. 3 is a plot of the points representative of the sampled amplitudes of the test window versus the sampled amplitudes of the reference window;

FIG. 4 is a plot of the sum of squared errors computed for each relative time shift between the trace windows.

DETAILED DESCRIPTION OF THE INVENTION

Figure 5:
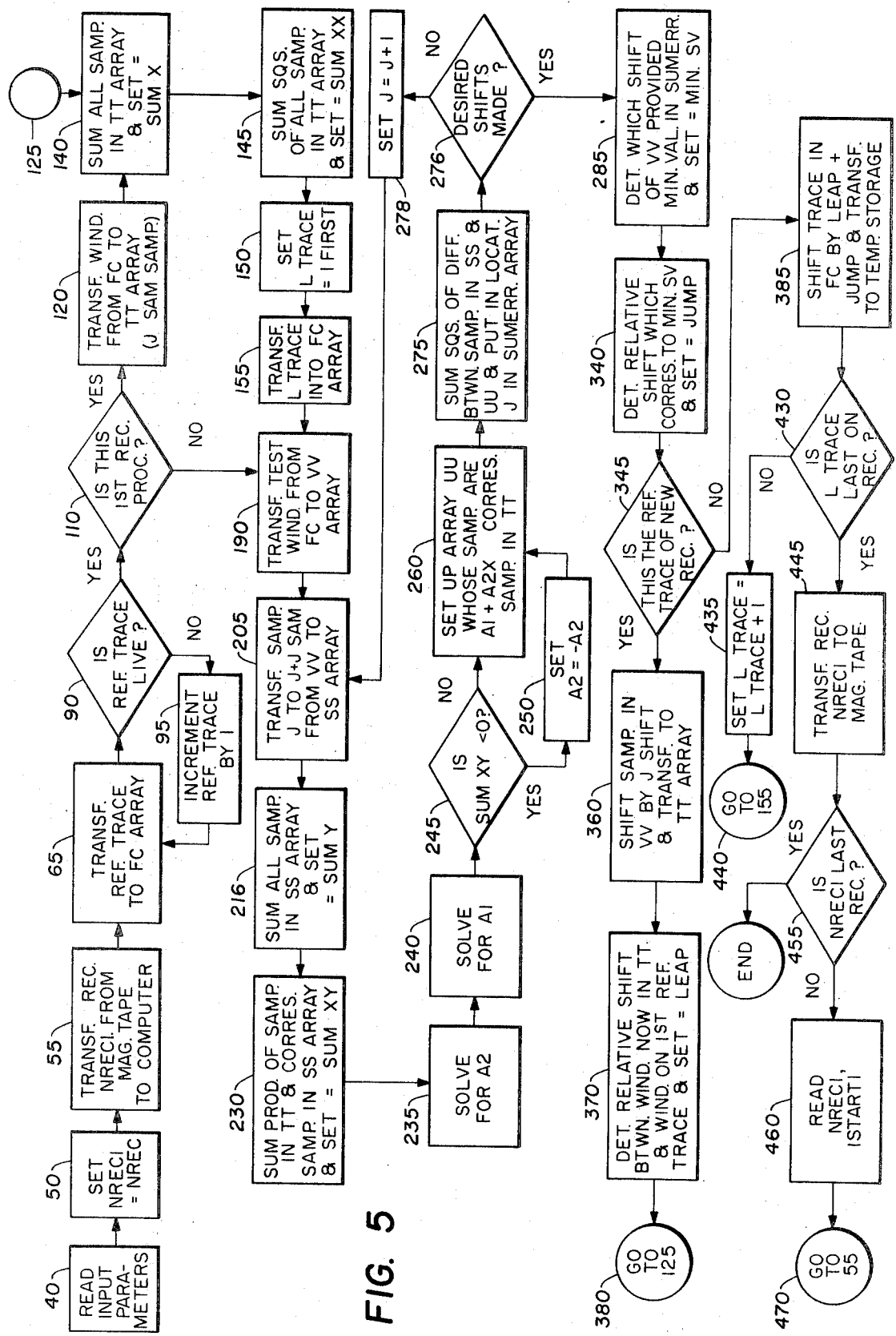
FIG. 5 is a flow diagram for the implementation of the method of this invention on a general purpose digital computer.

The present invention is capable of determining the static shift between any geophysical signals having the same independent variable. As used herein, the term "geophysical signal" shall mean generically any function which is dependent upon some geophysical condition of the earth. For example, a geophysical signal may be raw, unprocessed field data, such as well logs, seismic traces and the like, or any function which has been derived from raw field data. The application for which this invention is particularly suited is in determining the static time error between seismic traces.

In the following description, there will first be described the basic principles of the invention as applied to determining the static time error between only a pair of seismic traces. Later there will be described the details of the implementation of the invention on a digital computer for the correction of many seismic traces in a record section.

THE METHOD

FIG. 1 illustrates a pair of seismic traces $X(t)$ and $Y(t)$ which may be two adjacent traces from a magnetically recorded seismic record section. As can be observed, $X(t)$ and $Y(t)$ have corresponding reflection wavelets following time breaks 20 and 20a which represent the instant of generation of seismic energy in the field. However, the corresponding reflection wavelets are shifted in time relative to one another due to the static time error from the sources of error mentioned above. The trace $X(t)$ may be denoted as the reference trace and the trace $Y(+)$ may be denoted as the test trace. The relationship between $X(t)$ and $Y(t)$ can be expressed by the following equation:

$$X(t) \approx M \cdot Y(t-\tau_0) \quad (1)$$

Equation 1 states that $X(t)$ and $Y(t)$ are approximately equal except for a proportionality factor M, which represents the relative amplitude of the two traces, and for a static time shift $\tau_0$.

The objective of this invention is to determine this static time error $\tau_0$. Once $\tau_0$ has been determined accurately, the test trace $Y(t)$ may be shifted along its time axis by an amount $\tau_0$ so that its reflection wavelets line up with the corresponding reflection wavelets on the reference trace $X(t)$. More specifically, the components of the trace $Y(t)$ can be shifted by an amount $\tau_0$ toward the time break 20a.

The static time error $\tau_0$ may be defined by determining the relative time shift between test trace $Y(t)$ and the reference trace $X(t)$ at which the two traces are most alike. This invention uses a unique criterion for determining when the two traces are most alike. The criterion is that the two traces are most alike when their transformation to the Cartesian coordinate domain best approximates a straight line.

In determining the incremental time shift at which traces $X(t)$ and $Y(t)$ are most alike, it has been found desirable to select a window from each of the traces for comparison. A window is defined as a portion of a trace during a time segment. Thus, a reference window 25 is selected from the reference trace $X(t)$ during a time segment from $t_1$ to $t_m$. It is very important to set up a good reference window against which other windows are to be tested. The reference window should have unique characteristics distinguishing it from nearby portions of the reference trace. Thus, the reference window should have one or more reflections of good character such as the reflection wavelet 27.

Next, a test window 30 is selected from the test trace $Y(t)$ over a time segment from $t_0$ to $t_n$. The test window 30 is selected over a time segment which is longer than that of the reference window and includes a reflection wavelet 27a corresponding to the reflection wavelet 27. Preferably the test window 30 is selected symmerically in time about the reference window 25; that is, so that $t_0-t_1=t_m-t_n$. Typically, the reference window 25 is about 400 milliseconds in duration and the test window 30 is about 460 milliseconds in duration. Preferably, the reference trace and the test trace have previously been corrected for normal moveout before the process of this invention is applied. If so, the reference window 25 is selected beginning at a time $t_1$ after the time break 20 which is early on the seismic trace, perhaps at about one second. If the reference and test traces have not been corrected for normal moveout, then the reference window 25 may be selected at a time late on the trace at about four seconds where the normal moveout error is negligibly small.

In accordance with the present invention, the static time error $\tau_0$ between the reference trace $X(t)$ and the test trace $Y(t)$ is defined by determining the relative shift at which the reference window 25 and a test subwindow of the same length are most alike. Various subwindows of test window 30 are tested against the reference window 25 to find out which subwindow is most like window 25.

The reference window 25 and various subwindows 30a, 30b, 30c, and 30g of the test window 30 have been illustrated in FIGS. 2B–2F in various sequential shifting positions for positive shifts of the test window. Window 25 and subwindows 30a, 30b, 30c, and 30g are illustrated in sampled data form. It is well known that a function can be represented as a digital signal by series of spaced samples which have an assigned amplitude and polarity and which define the envelope of the function. In digital form, reference window 25 becomes:

$$X(t) = X_1(t) + X_2(t-k\Delta t) + X_2(t-2k\Delta t) + \ldots \quad (2)$$

or, $$X(t) = \sum_{k=1}^{N} X_k(t-k\Delta t) \quad (3)$$

and similarly the subwindow of test window 30 becomes:

$$Y(t) = \sum_{k=1}^{N} Y_k(t-k\Delta t) \quad (4)$$

where $X_k$ and $Y_k$ are sample values at time $(t+k)$,
$\Delta t$ is the sampling rate, and
N is the number of samples in the reference window.

The sample numbers for the two windows are illustrated in FIG. 2A, running from sample number 1 at the beginning of the reference window 25 up to sample N at the end of reference window 25. FIG. 2C illustrates a test subwindow 30a at a first incremental shift relative to the reference window 25.

The criterion for determining the likeness between reference window 25 and test subwindow 30a may be explained by first considering the transformation of the samples of the two windows from the time domain into the Cartesian coordinate domain. Each corresponding pair of time samples $X_k$, $Y_k$ becomes a point in the Cartesian coordinate plane. This point has an X coordinate which is the sample value on reference window 25 at time $(t+k)$ and has a Y coordinate which is the sample value of the test subwindow 30a at the same time. FIG. 3 illustrates a Cartesian coordinate system where the corresponding pairs of samples from the reference window 25 and the test subwindow 30a are plotted. If the two windows differ only in amplitude, they transform into the Cartesian coordinate domain of FIG. 3 into a straight line. However, since the window 25 and subwindow 30a have a time shift between them, the transformation to the Cartesian coordinate plane of FIG. 3 does not fall on a straight line. Therefore, the criterion for determining the likeness between window 25 and subwindow 30a is how closely the transformed points define straight line.

More specifically, consider that the corresponding pairs of samples of window 25 and subwindow 30a are transformed to the Cartesian coordinate system of FIG. 3. That is, for sample $k=1$, the plotted point in the Cartesian coordinate plane is $X_1$, $Y_1$. For $k=2$, the plotted point is $X_2$, $Y_2$. For $k=3$, the plotted point is $X_3$, $Y_3$. Now, if other points are similarly plotted, for the rest of the samples of the two windows, there will be produced a scatter diagram of points. Depending upon how nearly alike the window 25 and subwindow 30a are, the plotted points will approach lying on a straight line. As used herein, the groups of points representative of the amplitude of the reference window versus the sampled amplitude of a portion of the same length of the test window for corresponding values of time of the reference window is defined as the actual function.

How closely the actual function, illustrated by the plotted points in FIG. 3, approaches being a straight line is first determined by computing the analytic expression for the straight line which fits the actual function in some approximate sense. The analytic expression defining this straight line is given by:

$$C_k = A_1 + (A_2) \cdot (X_k), \quad k = 1, 2, 3 \ldots N \qquad (5)$$

where:

$C_k$ is the criterion function defined above,
$A_1$ is the Y axis intercept of the straight line,
$A_2$ is the slope of the straight line, and
$X_k$ is the sample value of the reference window for the $k$ sample times.

Preferably, the approximate straight line determined for fitting the actual function is the one which fits it in the Least Squares sense. The expression for the Y-axis intercept $A_1$ and the slope $A_2$ of the straight line fitting the actual function in the Least Squares sense is given by the following equations:

$$A_2 = \frac{\left(\sum_{k=1}^{N} X_k\right) \cdot \left(\sum_{k=1}^{N} Y_k\right) - N \sum_{k=1}^{N} X_k Y_k}{\left(\sum_{k=1}^{N} X_k\right) \cdot \left(\sum_{k=1}^{N} X_k\right) - N \sum_{k=1}^{N} X^2_k} \qquad (6)$$

$$A_1 = \frac{\sum_{k=1}^{N} Y_k - A_2 \sum_{k=1}^{N} X_k}{N} \qquad (7)$$

Equations 6 and 7 may be found in similar form in Elements of Statistics, Elmer B. Mode, Prentice-Hall, Second edition, New York, 1951, at page 217. Equations 6 and 7 then uniquely define the straight line which best fits the actual function, illustrated by the plotted points in FIG. 3, in the Least Squares sense.

The quantitative measure of the likeness between window 25 and subwindow 30a is the deviation or error between the scatter diagram of the actual function and the straight line of the criterion function. As a measure of this error, there is preferably used the squared error defined by the following equation:

$$\text{sum of squared errors} = \sum_{k=1}^{N} (C_k - Y_k)^2 \qquad (8)$$

Equation 8 states that the error is given as the sum of the squares of the ordinate differences between the points of the actual function and the points of the criterion function. For example, for $k=1$, the distance 36 is the difference along the ordinate between the point $X_1$, $Y_1$ and the corresponding ordinate point on the straight line 35. The ordinate differences between the points of the actual function and the corresponding points on straight line 35 are computed. Then the sum of the squared errors is computed according to Equation 8 above. The sum of the squared errors then is a single quantity which represents the degree of likeness between window 25 and subwindow 30a. The smallest one of the sum of the squared errors produced among the relative incremental time shifts between reference window 25 and a subwindow of the same length of the test window 30 determines the static time error between the two windows.

Therefore, in accordance with the invention, the test window 30 is shifted to the left by an amount $\Delta t$ corresponding with the sampling interval of multiple thereof to a new position and a new subwindow 30b illustrated in FIG. 2D. Again the analytic expression is determined for the Least Squares straight line fit to the actual function of the amplitude of the reference window versus the amplitude of the test window for values of time of the reference window. Then for the shift $\tau = \Delta t$, the sum of the squared errors is again determined.

For each incremental time shift between the window 25 and a subwindow of test window 30, there is determined a sum squared error value. This error value may be plotted as curve 37 in FIG. 4 versus the relative time shift $\tau$ between reference window 25 and the various test subwindows of test window 30. In the process of this invention, the test window 30 is shifted by increments of a sample interval and a sum squared error is determined for each relative shift so that a suite of sum squared errors is defined by curve 37. The test window 30 is shifted along the entire length of the reference window 25; that is, until the last sample of the test window corresponds with the last sample of the reference window.

Next, the procedure outlined above for positive shifts between the test window 30 and the reference window 25 is repeated for negative shifts. A squared error value is computed for each incremental shift in the negative direction so that a complete error curve 37 (FIG. 4) is defined for both positive and negative shifts.

After the suite of squared errors has been determined for both positive and negative relative shifts, the minimum squared error value may be selected to determine the relative static time shift between windows 25 and 30. The minimum of curve 37, depicting the suite of squared error values, is at point 38. The squared error at 38 corresponds with a relative time shift $\tau_0$ which is equal to $6\Delta t$ or six sample increments. The shifted position of test window 30 corresponding to $\tau = 6\Delta t$ is shown in FIG. 2F. It will be observed that the shift depicted in FIG. 2F corresponds with a line-up between the windows 25 and 30.

Now that the static time error $\tau_0$ has been determined, the test trace $Y(t)$ of FIG. 1 may be shifted by the amount $\tau_0$ toward the time break 28 and the shifted trace $Y(t)$ may then be recorded along with trace $X(t)$ for future interpretation.

Digital computer implementation

The principles of this invention have thus far been described with reference to determining the static time error between only a pair of seismic traces. In actual practice, the method of this invention is used to determine the static time error and correct for that error for masses of data, usually in the form of seismic record sections containing many individual seismic traces. Modern-day seismic record sections are usually recorded in digital mode in the field and then are transported to a processing center where a general purpose digital computer is used to perform a series of computational steps to improve the quality of the data.

Accordingly, the preferred mode of carrying out the present invention is on a general purpose digital computer such as the Control Data Corporation, Model 6600. In the following, the processing step of the invention will be described in such detail as to permit one of ordinary skill in the art to carry out the invention by programming a general purpose digital computer. It will be understood, however, that the processing step can also be carried out by conventional analog equipment well known in the art.

The seismic data to be corrected for static errors is usually recorded in digital format on magnetic tape wound on reels. The individual records resulting from the recording of traces for a single shot point are contained in series on the reels of magnetic tape and each record contains a unique identifying code at the beginning of the record. Also, the individual traces comprising each of the records contain an identifying number.

The traces on all of the various records may be corrected for static errors in the following sequence of basic program steps:

(1) A reference window is selected from a portion of a reference trace on a first record.

(2) A test window slightly larger than the reference window is selected from a first test trace to be corrected.

(3) The test window is tested against the reference window by the method of this invention to determine which subwindow best fits the reference window.

(4) The test trace is shifted by the amount which provided the best fit in step 3.

(5) Steps 1–4 are repeated for the other traces on the first record.

All of the traces of the first record have now been lined up with the reference window on the reference trace.

(6) The start times for the test windows to be used on the second record are read in.

(7) The test window of the reference trace of the second record is set up.

(8) Steps 1–4 are repeated to correct the reference trace on the second record to the reference trace on the first record.

(9) A reference window on the reference trace of the second record is set up. The start time of this reference window was read in step 6.

(10) Steps 1–5 are repeated to correct all traces of the second record to the second reference trace.

(11) The same sequence of operations is continued for all other records.

When all of the input records have been processed with the steps above, all the output traces are corrected to a flat datum, that datum being the reference window of the first input record.

There will now be described the detailed program instructions for carrying out the foregoing basic steps with reference to the flow diagram of FIG. 5.

In the description of the flow diagram there will be used the nomenclature of the well-known computer programming language called FORTRAN which is described in McCracken, A Guide to Fortran Programming, John Wiley & Sons, 1961.

The following input parameters are first read into the computer.

NREC=the number of the first seismic record to be processed,
LREC=the number of the last record to be processed,
IRECO=the number of the first output record,
NSAMPL=the number of samples per trace,
KTRACE=the number of the reference trace,
ISTART=the number of the first sample in the reference window,
JSAM=the number of samples in the reference window,
JSHIFT=the number of samples between the first sample in the reference window and the first sample in the larger test window. JSHIFT specifies in samples the equivalent of $(t_1-t_0)$ in FIG. 1,
IFIRST=the number of first trace to be processed,
ILAST=the number of the last trace to be processed.

Instruction 40 reads into the computer memory the foregoing input parameters.

Instruction 50 sets NREC, the number of the first record to be processed, equal to NREC1.

Instruction 55 calls up a SUBROUTINE to transfer the first record to be processed (NREC1) from magnetic tape into the computer memory.

Instruction 65 calls up a SUBROUTINE to transfer the reference trace (KTRACE) from magnetic tape into array FC in the computer.

Instruction 90 checks the reference trace to determine whether it is sufficiently "live." This may be conveniently done by a series of instructions which determine the average sample amplitude of the reference trace. Then, an IF statement may be used to compare the average sample amplitude with a preselected average sample amplitude. If the reference trace is sufficiently "live," then the program moves on to instruction 110. If the reference trace is not sufficiently "live," then an IF statement causes the program to increment the number of the reference trace by one in instruction 95 and instruction 65 is repeated for a reference trace whose number has been incremented by one.

Instruction 110 determines with an IF statement whether the record stored in the computer in instruction 55 is the first record to be processed. If the answer is "yes," the program goes to instruction 120. If the answer is "no," the program skips instructions 120–155 and goes on to instruction 190.

Instruction 120 transfers the samples in the reference window from the FC array to the TT array. The transferred reference window begins with sample number ISTART and extends a total of JSAM samples.

Instructions 140–230 compute the components of Equations 6 and 7 above necessary to solve the parameters $A_2$ and $A_1$.

Instruction 140 computes the summation of all the samples in the TT array and stores the sum as SUMX.

Instruction 145 computes the squares of the samples of the reference window stored in array TT and then the summation of all of the squared samples. The sum of the squared samples is then stored at SUMXX.

Instruction 155 calls a SUBROUTINE to transfer the first trace to be processed (IFIRST) into array FC.

Instruction 190 transfers the test window from the FC array to the VV array.

Instruction 205 transfers from array VV the samples from J to J+JSAM to the array SS where J is a running integer beginning with one. This instruction picks from array VV the first set of samples in the test window which is to be compared with the reference window to determine the degree of likeness between the two sets of samples.

Instruction 216 computes the sum of all the samples in array SS and stores that sum as SUMY.

Instruction 230 computes the sum of the product of the samples in the TT array and the corresponding samples in the SS array and stores that sum as SUMXY.

Instruction 235 computes the parameters $A_2$ for the slope of the Least Squares straight line which fits the actual function of the amplitude of the samples in the SS array versus the amplitude of the samples in VV array. $A_2$ is computed according to Equation 6 above.

Instruction 240 solves for $A_1$ which is the intercept of the same straight line. $A_1$ is computed according to Equation 7 above.

Instruction 245 rejects data which is 180 degrees out of phase. That is, it rejects a negative value of the slope $A_2$ which defines a straight line lying in the second and fourth quadrants in the Cartesian coordinate plane. This check is accomplished with an IF statement in step 245 by determining whether SUMXY is less than zero. If SUMXY is greater than or equal to zero, the program goes on to instruction 260. If SUMXY is less than zero, $A_2$ is set equal to $-A_2$ in step 250, and the program goes on then to instruction 260.

Instruction 260 sets up an array called UU, each sample of which is equal to the value $A_1+A_2$ multiplied by the corresponding sample in the TT array. Step 260 generates the criterion function described above and given by Equation 5.

Instruction 275 computes the sum of the squared errors between the samples of the criterion function in the UU array and the samples of the test window in the SS array according to Equation 8 above. The computed sum is then put in location J in array SUMERR.

Now with instructions 120–275, an error function has been calculated for the first shift between the reference window and the test window. The same steps may now be repeated again for the remaining relative shifts between the reference window and the test window. The computations carried out in instructions 120–190 need not be repeated since these computations remain constant for all of the relative shifts.

Instruction 276 then checks to find whether the desired number of incremental shifts between the reference window and the test window have been made. As just described, with the first shift between the two windows where J is equal to one, instruction 276 determines that the desired number of shifts have not been made and instruction 278 sets $J=J+1$. The program then returns to instruction 205 where a new test window is selected from array SS. This new test window comprises the samples $J=2$ to $J=2+JSAM$. Then instructions 216–240 are repeated for the newly selected test window and the parameters $A_1$ and $A_2$ for a new straight-line fit are computed. Next instructions 260 and 275 are carried out to compute a new value of error between the criterion function stored in array UU and the actual function stored in array SS. The resulting second error value is then stored in location $J=2$ in the array SUMERR.

Finally, when the desired number of shifts have been made, instruction 276 transfers the program on to instruction 285. Instruction 285 determines which of the values in all of the locations of the SUMERR array is the smallest. The shift, or value of J, which provided this minimum is set to equal to MINSV.

Instruction 340 determines the relative shift between the test window and the reference window which corresponds to shift MINSV. This relative shift is then set equal to JUMP.

Instruction 345 determines whether the test trace now in array FC is the reference trace of a new record. If the test trace is not the reference trace of a new record, the program proceeds to instruction 385.

Instruction 385 shifts the test trace located in array FC by an amount equal to LEAP+JUMP and transfers the shifted trace to temporary storage. The correction for any test trace is the sum of the correction to the reference trace (JUMP) and the correction of the reference trace itself (LEAP). Note: For the first record, LEAP=0.

Instruction 430 tests to determine whether the test trace (LTRACE) is the last trace on the record (ILAST). If LTRACE is not equal to ILAST the program proceeds to step 435 where LTRACE is incremented by one. The program then jumps in statement 440 back to instruction 155. Then in instructions 155–385 a new static time error correction is computed for the new test trace.

If instruction 430 determines that the test trace (LTRACE) is equal to the last trace on the record (ILAST), the program proceeds on to instruction 445. Instruction 445 calls a SUBROUTINE to transfer record number NREC1 from storage in the computer onto magnetic tape.

Instruction 455 tests to determine whether the record last transferred on the magnetic tape (NREC1) is equal to the last record to be processed (LREC). If so, the program goes on to END. If not, the program goes on to instruction 460 where a new record number and beginning of the first sample in the reference window is read into the computer. Then, in step 470 the program returns to instruction 55 where the next record is read from magnetic tape into the computer storage.

Instructions 65–340 determine the static time error between the reference trace of the new record and the reference trace of the previous record.

Step 345 determines whether the test trace now in array FC is the reference trace of a new record. Since the test trace is the reference trace of a new record, the program goes on to instruction 360 where the samples of the test window stored in array VV are shifted by an amount JSHIFT and transferred to the array TT. The test trace which has just been compared in instructions 110–345 is transferred to the array TT to become the reference trace of the remaining traces on its own record.

Instruction 370 determines the relative time shift between the reference trace now in the TT array and the previous reference window and sets that shift equal to LEAP.

Instruction 380 returns the program to step 125 which is a re-entry for step 140.

Finally, with instructions 140–455 the static time error between the reference trace of the newly read-in record and all of the test traces in this record are computed and the test traces are shifted by the computed amount.

In explaining the invention so far, it has been assumed that the test traces which are being static corrected bear wavelets representative of flat subsurface dip. All of the wavelets lying within the test windows among adjacent traces in a record section will be flattened across the record section to the reference window on the first record. It will be readily apparent that the described steps for determining the absolute static time error between seismic traces may be modified to put back into the record section an arbitrary amount of dip.

Now that the invention has been fully described and illustrated, it will become apparent to those skilled in the art that certain modifications may be made in the invention. It is intended to cover all such modifications as fall within the scope of the appended claims.

The invention claimed is:

1. An automatic machine implemented method of determining the static shift between a first geophysical signal and a second geophysical signal having the same independent variable, comprising the steps of:
   (a) generating in an automatic machine a criterion function representative of the analytic expression for the approximate straight-line fit to the actual function of the amplitude of the first geophysical signal versus the amplitude of the second geophysical signal for values of the independent variable of one of the signals,
   (b) generating in the machine an error function representative of the error between said criterion function and said actual function,
   (c) shifting in the machine said geophysical signals relative to one another with respect to the independent variable and repeating the foregoing steps for each relative shift, and
   (d) selecting in the machine as the static shift between said geophysical signals a shift related to the relative shift which corresponds with the minimum of said error function.

2. The method of claim 1 including the following additional steps for correcting for the static shift:
   (e) shifting said first geophysical signal relative to said second geophysical signal by said selected static shift, and
   (f) recording the shifted geophysical signals.

3. A method as in claim 1 wherein step (a) includes the step of generating a criterion function representative of the analytic expression for the Least Squares straight-line fit as an approximate straight-line fit, and wherein step (b) includes generating an error function representative of the sum of the squared errors between said criterion function and said actual function for corresponding values of the independent variable.

4. An automatic machine implemented method of determing the static time error between a reference seismic trace and a test seismic trace, comprising the steps of:
   (a) selecting from the reference seismic trace a reference window which includes at least one seismic event,
   (b) selecting from the test seismic trace a test window which is longer than said reference window and which includes at least one corresponding seismic event,
   (c) computing in an automatic machine the parameters of the analytic expression for the Least Squares straight-line fit to the actual function of the amplitude of said reference window versus the amplitude of a portion of the same length of said test window for values of time of said reference window, (d) generating in the machine from said computed parameters a criterion function representative of said analytic expression, (e) computing in the machine the sum of the squared errors between said criterion function and said actual function for values of time of said reference window, (f) successively shifting in the machine said test window relative to said reference window by a constant time increment and repeating steps (c), (d), and (e) for each relative time shift, and (g) selecting in the machine as the static time error between the seismic traces a time related to the relative time shift which corresponds with the smallest sum of squared errors.

5. The method of claim 4 including the following additional steps for correcting for the static time error:

(h) shifting said test seismic trace relative to said reference seismic trace by said selected static time error, and (i) recording the shifted seismic traces.

6. The method of claim 4 wherein step (g) includes selecting as the static time error between the seismic traces the relative time shift which corresponds with the smallest sum of squared errors.

7. A method of operating a digital computer to transform a seismic record section containing static time errors into a record section with the static time errors substantially removed, comprising the steps of:

(a) selecting a reference window of the samples of a reference trace on said record section, said reference window including at least one seismic event, (b) selecting a test window of the samples of a first test trace on said record section, said test window being longer than said reference window and including at least one corresponding seismic event, (c) computing the parameters of the analytic expression for the Least Squares straight-line fit to the actual function of the amplitude of the samples in the reference window versus the amplitude of the samples of a like portion of the test window for corresponding samples of the reference window, (d) generating from said computed parameters a criterion function representative of said analytic expression, (e) summing the squares of the errors between the samples of said criterion function and the samples of said actual function, (f) successively shifting said test window by a constant sample increment relative to said reference window and repeating steps (c), (d), and (e) for each relative shift, (g) selecting as the static time error between the reference trace and the test trace a time related to the relative time shift which corresponds with the smallest sum of the mean squared errors, (h) shifting said first test trace relative to said reference seismic trace by said selected static time error, and (i) selecting a new test window from each of the other traces of said record section and repeating steps (c) through (h).

References Cited

UNITED STATES PATENTS 3,284,765  11/1966  Bratton _____ 340—15.5

RICHARD A. FARLEY, Primary Examiner

W. T. RIFKIN, Assistant Examiner